United States Patent
Liu et al.

(10) Patent No.: US 9,917,793 B2
(45) Date of Patent: Mar. 13, 2018

(54) DATA PACKET PROCESSING IN SDN

(71) Applicant: International Business Machines Corporation, Armonk, NY (US)

(72) Inventors: Tian Cheng Liu, Beijing (CN); Bao Hua Yang, Beijing (CN); Yue Zhang, Beijing (CN); Kai Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 14/666,472

(22) Filed: Mar. 24, 2015

(65) Prior Publication Data
US 2015/0281127 A1    Oct. 1, 2015

(30) Foreign Application Priority Data
Mar. 26, 2014    (CN) .......................... 2014 1 0117452

(51) Int. Cl.
*H04L 12/947* (2013.01)
*H04L 12/741* (2013.01)
(Continued)

(52) U.S. Cl.
CPC .......... *H04L 49/25* (2013.01); *H04L 41/0893* (2013.01); *H04L 47/2475* (2013.01);
(Continued)

(58) Field of Classification Search
CPC ... H04L 45/745; H04L 47/2475; H04L 49/25; H04L 49/70
See application file for complete search history.

(56) References Cited

U.S. PATENT DOCUMENTS

2003/0056001 A1    3/2003    Mate et al.
2013/0010803 A1    1/2013    Yamaguchi
(Continued)

FOREIGN PATENT DOCUMENTS

CN    101170472 A    4/2008
CN    103036653 A    4/2013
(Continued)

OTHER PUBLICATIONS

Zareck, A., "OpenFlow Timeouts Demystified", Department of Computer Science, University of Toronto, Adam Zarek, 2012.*
(Continued)

*Primary Examiner* — Awet Haile
(74) *Attorney, Agent, or Firm* — Scully, Scott, Murphy & Presser, P.C.; David M. Quinn, Esq.

(57) ABSTRACT

The present invention discloses a method and apparatus for processing a data packet in a software defined network SDN protocol-based network. The method comprises: receiving a data packet forwarded by a SDN switch in the network; obtaining a rule corresponding to a data flow where the data packet is located; determining, according to the received data packet, data flow characteristics of the data flow where the data packet is located; determining timeout information of the rule according to a predetermined matching relationship between the data flow characteristics and the timeout information, the timeout information indicating time that the rule will be kept in a flow table of the SDN switch; and sending the rule and the timeout information of the rule to the SDN switch for processing the data packet by the SDN switch according to the rule. By means of the method and apparatus of the embodiments of the present invention, the timeout information of the rule may be set flexibly, so that the performance of SDN is boosted efficiently.

16 Claims, 4 Drawing Sheets

(51) Int. Cl.
*H04L 12/931* (2013.01)
*H04L 12/859* (2013.01)
*H04L 12/24* (2006.01)

(52) U.S. Cl.
CPC ............ *H04L 49/70* (2013.01); *H04L 41/083* (2013.01); *H04L 45/745* (2013.01)

(56) References Cited

U.S. PATENT DOCUMENTS

| | | | |
|---|---|---|---|
| 2013/0051379 A1 | 2/2013 | Wang et al. | |
| 2013/0100951 A1* | 4/2013 | Ishizuka | H04L 47/20 370/389 |
| 2013/0308645 A1* | 11/2013 | Karino | H04L 47/10 370/392 |
| 2014/0089506 A1* | 3/2014 | Puttaswamy Naga | H04L 45/42 709/225 |

FOREIGN PATENT DOCUMENTS

| | | |
|---|---|---|
| CN | 103209121 A | 7/2013 |
| WO | WO 2013/020126 A1 | 2/2013 |

OTHER PUBLICATIONS

Fernandez et al., "Evaluating OpenFlow Controller Paradigms," ICN 2013: The Twelfth International Conference on Networks, IARIA 2013, publication date: Jan. 27, 2013; pp. 151-157.

Katta et al., "Infinite CacheFlow in Software-Defined Networks," Princeton Computer Science Technical Report TR-966-13, Oct. 2013.

Kissel et al., "Driving Software Defined Networks with XSP," 2012 IEEE International Conference on Communications (ICC), Jun. 10-15, 2012, pp. 6616-6621.

Luo et al., "Enhancing Responsiveness and Scalability for OpenFlow Networks via Control-Message Quenching," 2012 International Conferene on ICT Convergence (ECTC); Oct. 15-17, 2012, pp. 348-353.

* cited by examiner

DATA PACKET PROCESSING IN SDN

FIELD

The present invention relates to network transmission, and more specifically, to a method and apparatus for processing a data packet in SDN.

BACKGROUND

Software Defined Network (SDN) is a novel network architecture, which separates control functionality from a network switch device, immigrates it to a logically independent network control system and thereby achieves flexible control of network traffic.

In SDN, there is a logical control layer and a device layer. The control layer is a part which makes forwarding decisions in a data network, including management, routing protocol, routing policy, etc. The device layer includes querying, switching and buffering with respect to each packet, e.g., including switches (SDN switches) supporting SDN protocols (such as the Openflow protocol).

A basic function of the SDN control layer is to manage rules inside a switch, e.g., when and how to remove a rule from a flow table of the switch. Typically the SDN switch leverages timeout (i.e., a maximum time interval between two packets) to remove rules of inactive flows. If the timeout is too short, then frequent interaction between the control layer and the switch is caused, which adds latency. On the other hand, as limited by hardware in the SDN switch, too long timeout will make the switch's flow table filled with a lot of inactive rules. Therefore, the effectiveness of timeout judgment will prejudice basic performance of SDN.

SUMMARY

In view of the above-described problems, it is desired to provide a solution for flexibly setting timeout for a rule.

According to one aspect of the present invention, there is provided a method for processing a data packet in a software defined network SDN protocol-based network, comprising: receiving a data packet forwarded by a SDN switch in the network; obtaining a rule corresponding to a data flow where the data packet is located; determining, according to the received data packet, data flow characteristics of the data flow where the data packet is located; determining timeout information of the rule according to a predetermined matching relationship between the data flow characteristics and the timeout information, the timeout information indicating time that the rule will be kept in a flow table of the SDN switch; and sending the rule and the timeout information of the rule to the SDN switch for processing the data packet by the SDN switch according to the rule.

According to another aspect of the present invention, there is provided an apparatus for processing a data packet in a software defined network SDN protocol-based network, comprising: a transmission module configured to receive a data packet forwarded by a SDN switch in the network; a rule obtaining module configured to obtain a rule corresponding to a data flow where the data packet is located; a data flow characteristic determining module configured to determine, according to the received data packet, data flow characteristics of the data flow where the data packet is located; a timeout determining module configured to determine timeout information of the rule according to a predetermined matching relationship between the data flow characteristics and the timeout information, the timeout information indicating time that the rule will be kept in a flow table of the SDN switch; wherein the transmission module is further configured to send the rule and the timeout information of the rule to the SDN switch for processing the data packet by the SDN switch according to the rule.

By means of the method and apparatus of the embodiments of the present invention, rules' timeouts may be set flexibly, so that the performance of SDN is boosted efficiently.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
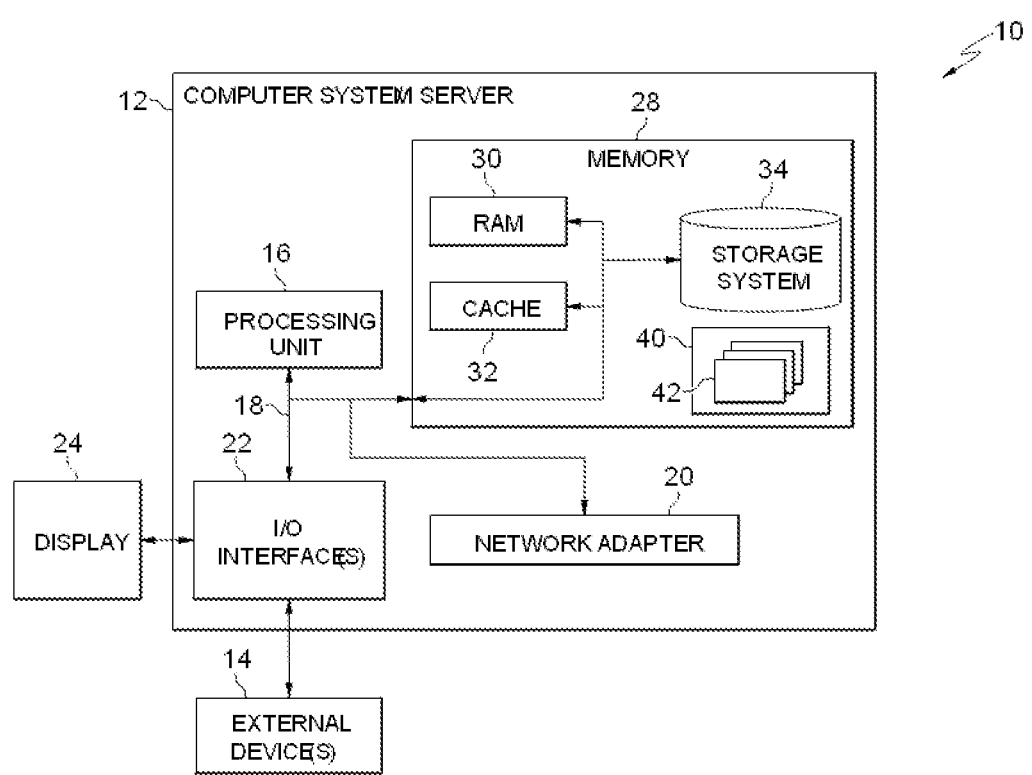
FIG. 1 shows a block diagram of an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A brief introduction is presented below to the workflow of SDN by taking data flow forwarding as an example. In SDN, a SDN switch is required to forward a data packet according to a forwarding rule given by the control layer. When the SDN switch receives the first data packet of a data flow, since there is no forwarding rule about the data packet locally in the SDN switch, the SDN switch has to forward the data packet to the control layer so as to obtain a corresponding forwarding rule from the control layer and store it to a local flow table. Afterwards, when the SDN switch receives a next data packet of the same data flow, it compares the data packet's address information with rule information in the local flow table. If a consistent entry can be found, then the SDN switch forwards the data packet according to the rule information in the flow table. In this course, the control layer performs routing calculation with respect to only the first data packet of each flow, and stores the result to the local flow table of the switch; then subsequent decision is implemented by looking up in the local flow table, so that the forwarding efficiency can be boosted. In order to increase the utilization efficiency of the flow table, the control layer will specify a timeout for rule information stored in the flow table, which timeout indicates how long the rule will be kept in the flow table. When the time for which the rule is kept in the flow table exceeds the timeout, the rule information is then removed from the flow table, so that more space is produced in the flow table for storing new rule information.

If the specified timeout is too short, then it is possible that before part of data packets of a flow reaches the switch, a rule corresponding to the flow has been removed from the flow table; in this case, the switch has to request the forwarding rule to the control layer again. However, if the specified timeout is too long, then it is possible that a rule about a flow is still saved in the flow table within a long period after all data packets of the flow have been transferred, so that precious space of the flow table is wasted.

Inventors of the present invention find that different types of applications vary considerably in respect of flow length. For example, most FTP (file transfer protocol) flows are quite large, while HTTP flows are typically short. Moreover, lengths of flows from different hosts also vary considerably. For example, relatively speaking, flows transferred by an active content server are usually far greater than that transferred by a log server. In this case, if the SDN switch sets a same timeout for rules of various flows, then a possible phenomenon is: for most FTP flows, rules' timeout is too short, so multiple packets from the same flow have to repetitively obtain rules from the control layer, which reduces the forwarding efficiency; for most HTTP flows, however, rules' timeout is too long, so that a large amount of flow rules that are no longer needed are saved in the flow table.

In view of these problems, there are proposed a method and system according to various embodiments of the present invention. With reference to the accompanying drawings, detailed description is presented below to the method and system according to various embodiments of the present invention.

Figure 2:
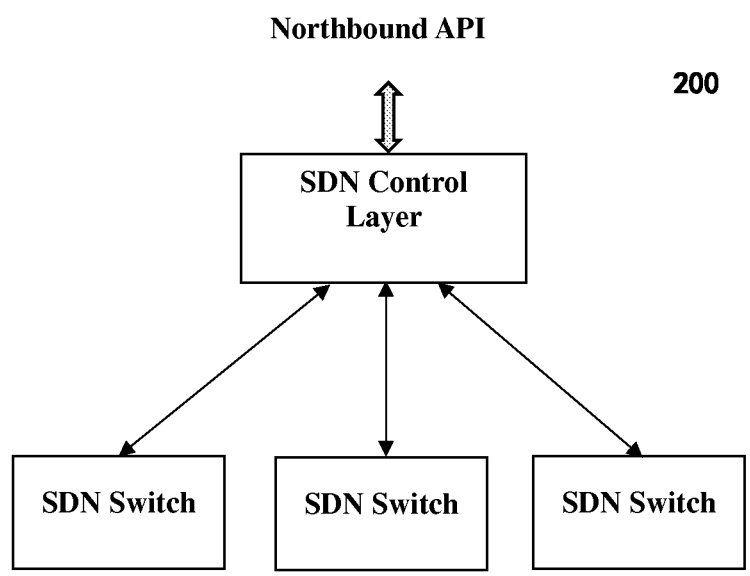
FIG. 2 shows a schematic architecture diagram of a SDN protocol-based network according to one embodiment of the present invention.

FIG. 2 shows a schematic architecture diagram of a SDN protocol-based network according to one embodiment of the present invention.

As seen from FIG. 2, the architecture is divided into two layers: a switch layer and a control layer, wherein the switch layer includes multiple SDN switches supporting SDN protocols.

According to one embodiment of the present invention, besides legacy modules supporting SDN, the control layer may further include a module for generating timeout information of a rule according to the present invention. The control layer may directly communicate with a user via a northbound API.

Figure 3:
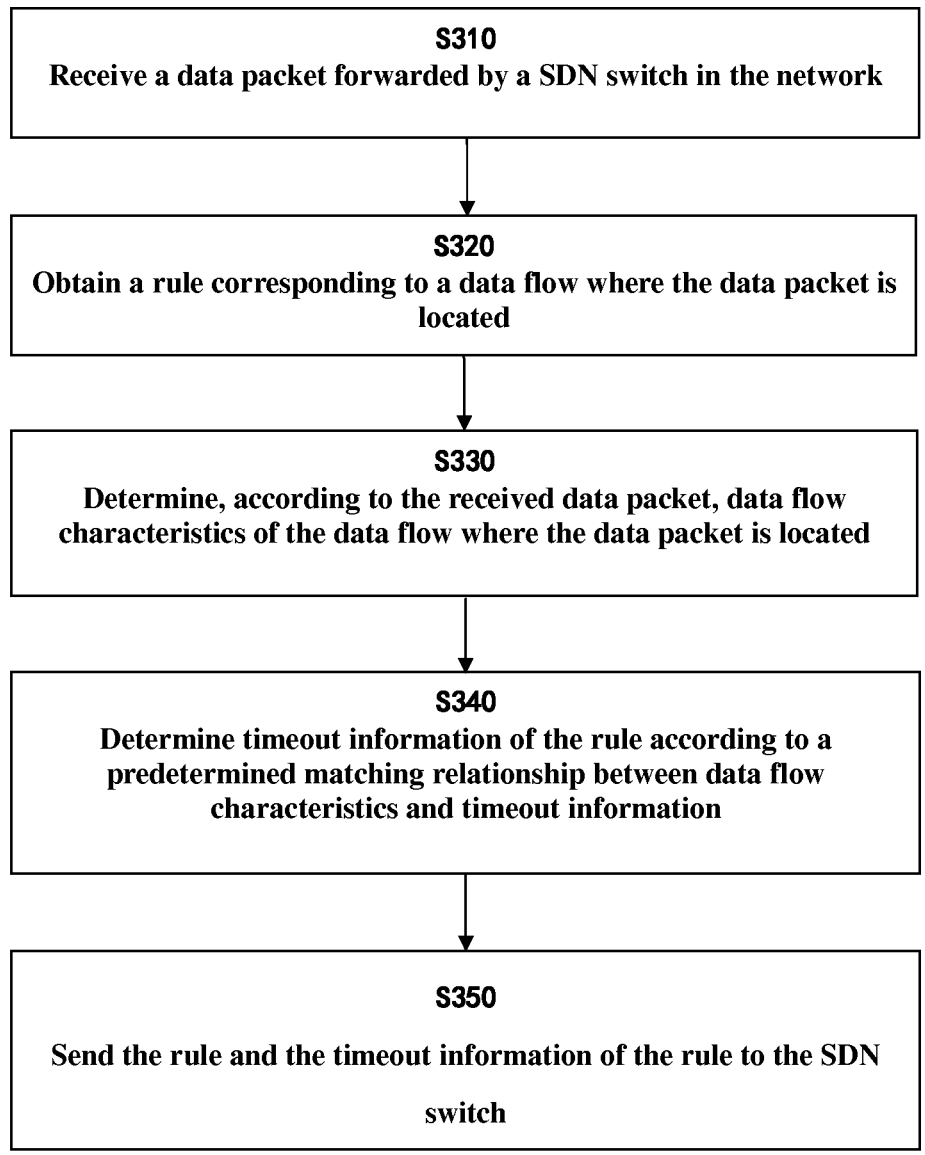
FIG. 3 shows a flowchart of a method for processing a data packet in SDN according to one embodiment of the present invention.

With reference to a flowchart shown in FIG. 3, illustration is presented below to the processing flow of the control layer according to one embodiment of the present invention.

First of all, in step S310 a data packet forwarded by a SDN switch in the network is received.

Under the SDN protocol, a SDN switch, after receiving a data packet from a user, first checks whether there exists in the SDN switch a forwarding rule matching a data flow to which the data packet belongs. If no forwarding rule matching the request is found, or the forwarding rule requires the data packet to be forwarded to the control layer, then the SDN switch forwards the data packet to the control layer.

In step S320, a rule corresponding to the data flow to which the data packet belongs is obtained.

According to one embodiment of the present invention, the control layer may look up historical data related to the data flow to which the data packet belongs, and obtain a corresponding rule according to the historical data.

If the data packet is the first packet of the data flow to which the data packet belongs, since no rule corresponding to the data flow has been generated previously, a corresponding rule may be generated by the control layer according to information contained in the data packet. If the control layer ascertains, according to information contained in the data packet, that other data packet of the same data flow has been received already, then the control layer may retrieve its database to find a previously stored rule corresponding to the data flow. Of course, the control layer may not store previously generated rules but generates a new corresponding rule for each data packet.

Regarding how the control layer generates rules corresponding to data flows and how the control layer obtains a rule corresponding to a new data packet according to previously stored rules, this may be implemented according to various legacy implementations in SDN and thus is not detailed here.

In step S330, data flow characteristics of the data flow to which the received data packet belongs are determined according to the data packet. The data flow characteristics may be any characteristics that prejudice timeout information, such as a protocol type of the flow, a length of the flow, characteristics of a host where the flow comes, etc. Related data flow characteristics may be determined according to information contained in the data packet such as packet head information. Also, data flow characteristics of a corresponding data flow may be obtained by comparing information contained in the data packet with historical data stored in the control layer.

In step S340, timeout information of the rule is determined according to a predetermined matching relationship between the data flow characteristics and timeout information. Here, the timeout information indicates time that the rule will be kept in a flow table of the SDN switch.

As mentioned above, lengths of data flows of different types of applications vary considerably, so the amount of data packets contained here also varies greatly. For example, most FTP flows are large, while HTTP flows are typically short. Therefore, different matching relationships with timeout information may be built according to different data flow characteristics, whereby after a data flow is received, timeout information of a rule may be determined according to the predetermined matching relationship between data flow characteristics and timeout information.

According to one embodiment of the present invention, the data flow characteristics may include protocol characteristics of a data flow, e.g., whether the data flow is an FTP flow or an HTTP flow, or other protocol flow, which may be obtained according to header information of the data packet. Different timeouts may be set with respect to different protocol types. For an FTP flow, a relatively large timeout may be set, while for an HTTP flow, a relatively small timeout may be set.

The data flow characteristics may further include characteristics of a host where the data flow comes, e.g., whether the host is a content server or a log server, etc., and whether the host is active or not, etc. Relatively speaking, flows transferred by an active content server are generally far greater than those transferred by a log server. In this case, a relatively large timeout may be set for flows transferred by a content server, while a relatively small timeout may be set for flows transferred by a log server.

Those skilled in the art may further set different timeouts according to other data flow characteristics as concrete application demands.

In step S350, the rule and the timeout information of the rule are sent to the SDN switch for processing the data packet by the SDN switch according to the rule.

Thus, when subsequent data packets of a same data flow reach the SDN switch, since a corresponding rule has been saved in the local flow table of the SDN switch, the data packet may be directly forwarded according to the rule without a need to request a rule to the control layer. Moreover, different timeouts are set for different data flows. For a long data flow, timeout for its rule in the flow table is relatively long, so the rule may live in the flow table for a relatively long time; thus, for subsequent data packets in the data flow, there is no need to request a rule to the control layer. For a short data flow, however, after all data packets contained in the data flow have been transferred, the rule is removed from the flow table in a short time, so that more flow table space is released for storing other rules.

By means of the method according to the above embodiment of the present invention, different timeouts may be set for rules of different data flows, thereby making effective use of space in the flow table of the SDN switch.

Those skilled in the art may understand that the method of the embodiment of the present invention is not necessarily implemented in an order as described above, and some of steps like steps 320 and 330 may be performed interchangeably or concurrently.

In addition to characteristic information of a data flow, other factor may further be considered when setting a corresponding timeout. According to one embodiment of the present invention, the control layer may receive from a SDN switch state information of the SDN switch's flow table, e.g., how many rules are stored in the current flow table, and how long the rules have been living in the flow table, etc. Moreover, timeout information of rules may further be determined according to the flow table's state information. For example, if the flow table's idle space is rather limited, or rules stored therein will live for a long time, then at this point a short timeout should be set; instead if the flow table's idle space is still ample or rules stored therein will soon time out, then a relatively long timeout may be set.

According to one embodiment of the present invention, the control layer may receive a SDN switch's flow statistical information from the SDN switch, and further determine timeout information of rules according to the flow statistical information. For example, if the statistical information indicates that most of flows received recently are large flows, then a great possibility that large flows will be received is predicted, thus a relatively long timeout is set; otherwise, a short timeout is set.

According to one embodiment of the present invention, a current network environment may further be considered. For example, the control layer may receive network statistical information, and further determine timeout information of rules according to the network statistical information. The statistical information may include current network traffic, network transmission rate, current network congestion situation and other information capable of reflecting the network's current conditions. For example, if the current network traffic is huge or the transmission rate is slow, then a long transmission time for a data flow is predicted, at which point a long timeout needs to be set; if the current network transmission rate is fast, then a short transmission time for a data flow is predicted, at which point a shorter timeout may be set.

Further description is presented below to different embodiments that the control layer determines data flow characteristics of a data flow to which a received data packet belongs, according to said received data packet.

As mentioned above, the data flow characteristics may be any characteristics that affect timeout information, such as a protocol type of the flow, a length of the flow, characteristics of a host where the flow comes, etc. Also, relevant data flow characteristics may be determined according to information contained in a data packet, such as header information and the like. Further, data flow characteristics of a corresponding data flow may be obtained by comparing information contained in the data packet with historical data stored in the control layer.

The control layer may contain a history database for storing records related to data packets. When the control layer receives the first data packet in a data flow, since there is no record related to the data packet in the history database, a record is then built in the history database, which record may contain information of a data flow to which the data packet belongs, such as flow protocol type, packet length, etc.

If data flow characteristics cannot be accurately determined according to information in the data packet at this moment, then the control layer may request the SDN switch to forward more data packets, for example, may instruct the SDN switch to transfer one or more subsequent data packets to the control layer by setting a "To Control Layer" rule. Even the control layer may specify needed data packets to SDN by a rule, e.g., the first, third and fifth data packets, etc., in the data flow.

The control layer, after obtaining sufficient information from the received data packet, may determine data flow characteristics of the data flow where the data packet comes. At this point, historical data related to the data flow to which the data packet belongs may be looked up, and data flow characteristics may be determined according to the historical data and the data packet. Later, the rule's timeout information is determined according to a predetermined matching relationship between data flow characteristics and timeout information.

According to one embodiment of the present invention, the predetermined matching relationship between data flow characteristics and timeout information may be directly set by the user at the control layer via the northbound API, or be automatically adjusted based on records stored in the history database. For example, the predetermined matching relationship between data flow characteristics and timeout information may be adjusted according to the data flow's actual living time in the flow table of the SDN switch.

In order to finally forward the data packet to a corresponding destination, each switch on the forwarding path from the source switch to the destination switch has to perform forwarding according to a rule generated by the control layer. At this point, after the control layer generates the forwarding rule and sets a corresponding timeout, the forwarding rule and its timeout information are respectively, proactively sent to each SDN switch on the forwarding path from the source switch to the destination switch, whereby these switches, after receiving a data packet forwarded by a preceding switch, can forward the data packet according to the corresponding forwarding rule and keep the rule in a local flow table according to the set timeout information until the timeout ends. In this manner, various SDN switches, when receiving the data packet, do not have to wait for the control layer processing, thereby greatly reducing the forwarding latency.

The various embodiments implementing the method of the present invention have been described above with reference to the accompanying drawings. Those skilled in the art may understand that the method may be implemented in software, hardware or a combination of software and hardware. Moreover, those skilled in the art may understand by implementing various steps in the above method in software, hardware or a combination of software and hardware, there may be provided an apparatus for data packet processing in SDN. Even if the apparatus has the same hardware structure as a general-purpose processing device, the functionality of software contained therein makes the apparatus manifest distinguishing properties from the general-purpose processing device, thereby forming an apparatus of the various embodiments of the present invention.

Figure 4:
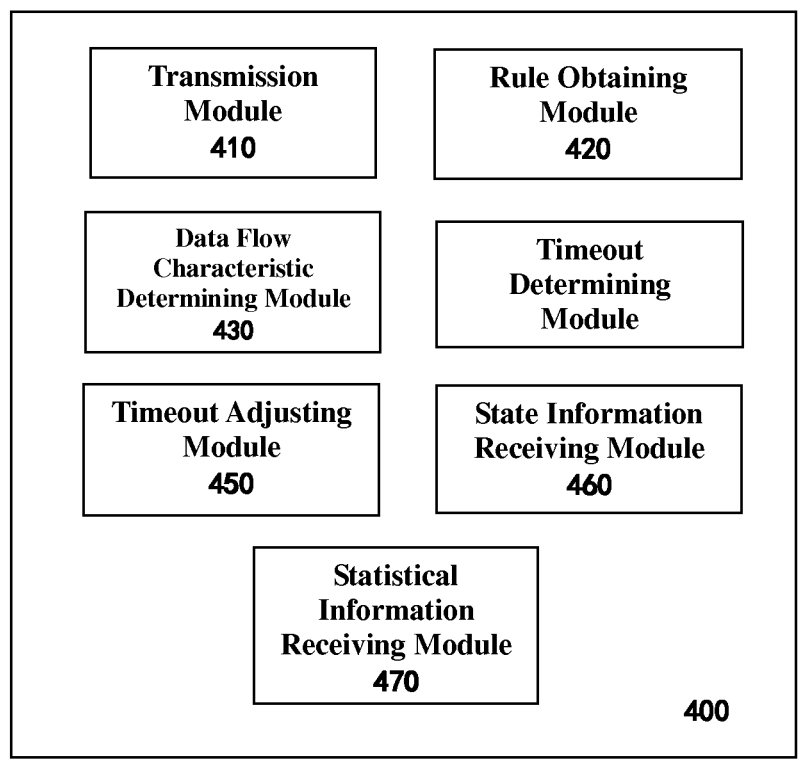
FIG. 4 shows a block diagram of an apparatus for processing a data packet in SDN according to one embodiment of the present invention.

With reference to FIG. 4, description is presented below to a block diagram of a control apparatus implementing the embodiment of the present invention. Control apparatus 400 may comprise: a transmission module 410, a rule obtaining module 420, a data flow characteristic determining module 430 and a timeout determining module 440.

According to one embodiment of the present invention, transmission module 410 is configured to receive a data packet forwarded by a SDN switch in a network. Rule obtaining module 420 is configured to obtain a rule corresponding to a data flow where the data packet is located. Data flow characteristic determining module 430 is configured to determine, according to the received data packet, data flow characteristics of the data flow where the data packet is located. Timeout determining module 440 is configured to determine timeout information of the rule according to a predetermined matching relationship between the data flow characteristics and the timeout information, the timeout information indicating time that the rule will be kept in a flow table of the SDN switch. Transmission module 410 is further configured to send the rule and the timeout information of the rule to the SDN switch for processing the data packet by the SDN switch according to the rule.

According to one embodiment of the present invention, control apparatus 400 further comprises a timeout adjusting module 450 configured to adjust the predetermined matching relationship between the data characteristics and the timeout information according to an actual stay time of the data flow in the flow table of the SDN switch.

According to one embodiment of the present invention, the data flow characteristic determining module is further configured to look up historical data related to the data flow where the data packet is located, and determine the data flow characteristics according to the historical data and the received data packet.

According to one embodiment of the present invention, the data flow characteristics comprise protocol characteristics of the data flow.

According to one embodiment of the present invention, the data flow characteristics comprise characteristics of a host where the data flow comes.

According to one embodiment of the present invention, control apparatus 400 further comprises a state information receiving module 460 configured to receive state information of the flow table of the SDN switch, wherein timeout determining module 440 is further configured to determine timeout information of the rule according to the state information of the flow table.

According to one embodiment of the present invention, control apparatus 400 further comprises a statistical information receiving module 470 for configured to receive statistical information of the network, wherein timeout determining module 440 is further configured to determine timeout information of the rule according to the statistical information of the network.

According to one embodiment of the present invention, rule obtaining module 420 is further configured to look up historical data related to the data flow where the data packet is located, and obtain the rule according to the historical data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a data packet in a software defined network (SDN) protocol-based network, comprising:
   receiving a data packet forwarded by a SDN switch in the network;
   obtaining one or more rules corresponding to a data flow where the data packet is located, the one or more rules being stored in a flow table of the SDN switch;
   obtaining state information of the flow table, the state information including a number of the one or more rules stored in the flow table and a time period of how long the one or more rules have been in the flow table;
   determining, according to the received data packet, data flow characteristics of the data flow where the data packet is located;
   setting timeout information of the one or more rules based on the data flow characteristics and the state information of the flow table, the timeout information indicating a time that the one or more rules will be kept in the flow table of the SDN switch; and
   sending the one or more rules and the timeout information of the one or more rules to the SDN switch for processing the data packet by the SDN switch according to the one or more rules.

2. The method according to claim 1, further comprising: adjusting a predetermined matching relationship between the data characteristics and the timeout information according to an actual stay time of the data flow in the flow table of the SDN switch.

3. The method according to claim 1, wherein the determining, according to the received data packet, data flow characteristics of the data flow where the data packet is located comprises:
   looking up historical data related to the data flow where the data packet is located; and
   determining the data flow characteristics according to the historical data and the received data packet.

4. The method according to claim 1, wherein the data flow characteristics comprise protocol characteristics of the data flow.

5. The method according to claim 1, wherein the data flow characteristics comprise characteristics of a host where the data flow comes from.

6. The method according to claim 1, further comprising: receiving statistical information of the network, and wherein the setting timeout information of the one or more rules further comprises: determining the timeout information of the one or more rules further according to the statistical information of the network.

7. The method according to claim 1, wherein the obtaining one or more rules corresponding to a data flow where the data packet is located comprises:
   looking up historical data related to the data flow where the data packet is located; and
   obtaining the one or more rules according to the historical data.

8. The method according to claim 1, wherein the setting timeout information of the one or more rules based on the data flow characteristics comprises:
   determining the timeout information according to a predetermined matching relationship between the data flow characteristics and the timeout information.

9. An apparatus for processing a data packet in a software defined network (SDN) protocol-based network, comprising:
   at least one processor; and
   a memory, coupled to the at least one processor, the memory storing processor-executable program instructions,
   wherein the at least one processor, when executing the program instructions, is configured to:
   receive a data packet forwarded by a SDN switch in the network;
   obtain one or more rules corresponding to a data flow where the data packet is located, the one or more rules being stored in a flow table of the SDN switch;
   obtain state information of the flow table, the state information including a number of the one or more rules stored in the flow table and a time period of how long the one or more rules have been in the flow table;
   determine, according to the received data packet, data flow characteristics of the data flow where the data packet is located; and
   set timeout information of the one or more rules based on the data flow characteristics and the state information of the flow table, the timeout information indicating a time that the one or more rules will be kept in the flow table of the SDN switch,
   wherein the at least one processor is further configured to send the one or more rules and the timeout information of the one or more rules to the SDN switch for processing the data packet by the SDN switch according to the one or more rules.

10. The apparatus according to claim 9, wherein the at least one processor is further configured to adjust a predetermined matching relationship between the data characteristics and the timeout information according to an actual stay time of the data flow in the flow table of the SDN switch.

11. The apparatus according to claim 9, wherein the at least one processor is further configured to:
    look up historical data related to the data flow where the data packet is located; and
    determine the data flow characteristics according to the historical data and the received data packet.

12. The apparatus according to claim 9, wherein the data flow characteristics comprise protocol characteristics of the data flow.

13. The apparatus according to claim 9, wherein the data flow characteristics comprise characteristics of a host where the data flow comes.

14. The apparatus according to claim 9, wherein the at least one processor is further configured to:

receive statistical information of the network; and
determine the timeout information of the one or more rules further according to the statistical information of the network.

15. The apparatus according to claim 9, wherein the at least one processor is further configured to:
look up historical data related to the data flow where the data packet is located; and
obtain the one or more rules according to the historical data.

16. The apparatus according to claim 9, wherein to set the timeout information of the one or more rules, the at least one processor is further configured to determine the timeout information according to a predetermined matching relationship between the data flow characteristics and the timeout information.

\* \* \* \* \*